United States Patent
Valley

(10) Patent No.: US 9,350,249 B2
(45) Date of Patent: May 24, 2016

(54) FLYBACK POWER SUPPLY REGULATION APPARATUS AND METHODS

(71) Applicant: TEXAS INSTRUMENTS INCORPORATED, Dallas, TX (US)

(72) Inventor: Richard L. Valley, Nashua, NH (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 31 days.

(21) Appl. No.: 13/681,699

(22) Filed: Nov. 20, 2012

(65) Prior Publication Data

US 2014/0140109 A1 May 22, 2014

(51) Int. Cl.
H02M 3/335 (2006.01)
H02M 1/42 (2007.01)

(52) U.S. Cl.
CPC ........ H02M 3/33507 (2013.01); H02M 1/4258 (2013.01); Y02B 70/126 (2013.01)

(58) Field of Classification Search
None
See application file for complete search history.

(56) References Cited

U.S. PATENT DOCUMENTS

| | | | | |
|---|---|---|---|---|
| 5,438,499 A * | 8/1995 | Bonte et al. | | 363/21.16 |
| 5,847,942 A * | 12/1998 | Bazinet et al. | | 363/25 |
| 6,094,362 A * | 7/2000 | Domingo | | 363/56.1 |
| 6,977,824 B1 * | 12/2005 | Yang et al. | | 363/21.16 |
| 8,467,157 B2 * | 6/2013 | Gaknoki et al. | | 361/18 |
| 2008/0192515 A1 * | 8/2008 | Huynh et al. | | 363/21.12 |
| 2008/0247199 A1 * | 10/2008 | Djenguerian et al. | | 363/50 |
| 2008/0259656 A1 * | 10/2008 | Grant | | 363/21.18 |
| 2009/0295348 A1 * | 12/2009 | Tao et al. | | 323/282 |
| 2010/0002480 A1 * | 1/2010 | Huynh et al. | | 363/90 |
| 2012/0327691 A1 * | 12/2012 | Strijker | | 363/21.01 |
| 2013/0119881 A1 * | 5/2013 | Fang et al. | | 315/210 |
| 2013/0272036 A1 * | 10/2013 | Fang | | 363/21.17 |
| 2013/0294118 A1 * | 11/2013 | So et al. | | 363/21.16 |

OTHER PUBLICATIONS

Fairchild Semiconductor datasheet part No. FAN103, dated 2010.
IWATT, Inc. datasheet part No. iW1710, dated Feb. 6, 2012.
ST Microelectronics datasheet HVLED805, dated Oct. 2010.

* cited by examiner

*Primary Examiner* — Timothy J Dole
*Assistant Examiner* — Monica Mata
(74) *Attorney, Agent, or Firm* — William B. Kempler; Frank D. Cimino

(57) ABSTRACT

Apparatus and methods disclosed herein are associated with a primary side voltage and/or current regulator (PSR) in a flyback power converter. Apparatus and methods sense characteristics of a waveform generated in an auxiliary primary winding of a flyback transformer at a single terminal of the PSR. The waveform is analyzed, and error signals derived therefrom are used to maintain constant voltage and/or constant current regulation and to generate a peak current stabilization signal that is independent of line input voltage.

12 Claims, 6 Drawing Sheets

US 9,350,249 B2

FLYBACK POWER SUPPLY REGULATION APPARATUS AND METHODS

TECHNICAL FIELD

Embodiments described herein relate to electronic switching power supplies, including apparatus and methods associated with primary side regulated flyback power supplies.

BACKGROUND INFORMATION

A flyback converter power supply is a buck-boost converter with the inductor split to form a transformer, so that the voltage ratios are multiplied with an additional advantage of galvanic isolation.

Many power supplies are of the "constant voltage" type. That is, they attempt to maintain constant output voltage across a rated current range, from zero to some maximum current. Within normal load ranges, voltage regulation employs a feedback signal related to output voltage. There are two common ways to generate this feedback signal. The first is to use a secondary reference and amplifier with an optocoupler to transfer the signal to the regulation controller. The second method utilizes a separate, "auxiliary" winding on the transformer and senses error signals from the auxiliary winding. The auxiliary winding may also supply operating power to the controller itself. The latter feedback method, referred to as "primary-side regulation," can provide good output voltage and current regulation without requiring the ancillary secondary feedback components described above.

SUMMARY OF THE INVENTION

Apparatus and methods disclosed herein are associated with a primary side voltage and/or current regulator (PSR) in a flyback power converter. Characteristics of a voltage waveform generated in an auxiliary primary winding of a flyback transformer represent converter output values such as output voltage and the timing of output current flow. The waveform appears at a single terminal of the PSR apparatus and is analyzed by apparatus and methods described below.

Error signals derived from the waveform characteristics are used to maintain regulation and to generate a peak current stabilization signal that is independent of line input voltage. The PSR apparatus modulates the frequency of subsequent conduction cycles and/or the amplitude of the primary current waveform via on/off control of a switch in series with the primary winding to maintain constant voltage and/or constant current regulation.

DETAILED DESCRIPTION

Figure 1A:
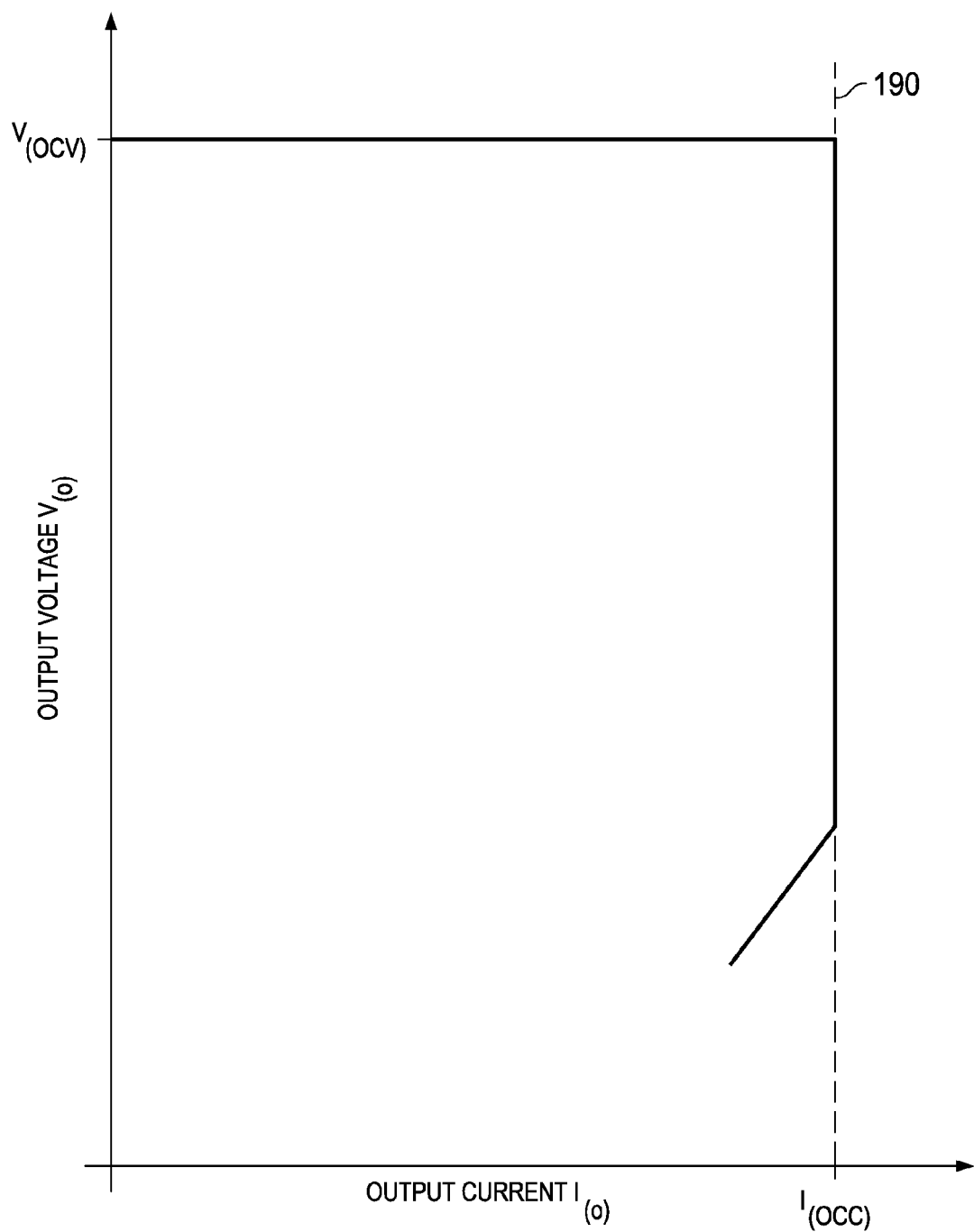
FIG. 1A is an output power characteristic diagram associated with a constant voltage/constant current primary side regulation flyback power converter according to various example embodiments.

FIG. 1A is an output power characteristic diagram associated with a constant voltage/constant current primary side regulation flyback power converter according to various example embodiments. The PSR apparatus may behave in various ways, according to the designer's intent, when maximum load current 190 is reached. Some embodiments may, for example, transition from a constant voltage to a constant current mode of regulation at this point. The resulting curve of FIG. 1A is sometimes referred to as a "square VI characteristic curve." As maximum output current is reached, that maximum current continues to flow independent of the output voltage level. In the vertical region of constant current and varying output voltage the converter is acting to regulate output current versus voltage. An example of the applicability of such behavior might be a universal serial bus (USB) power supply. The specification may provide for a minimum current source capability at a USB interface, even if load or output voltage sags.

Figure 1B:
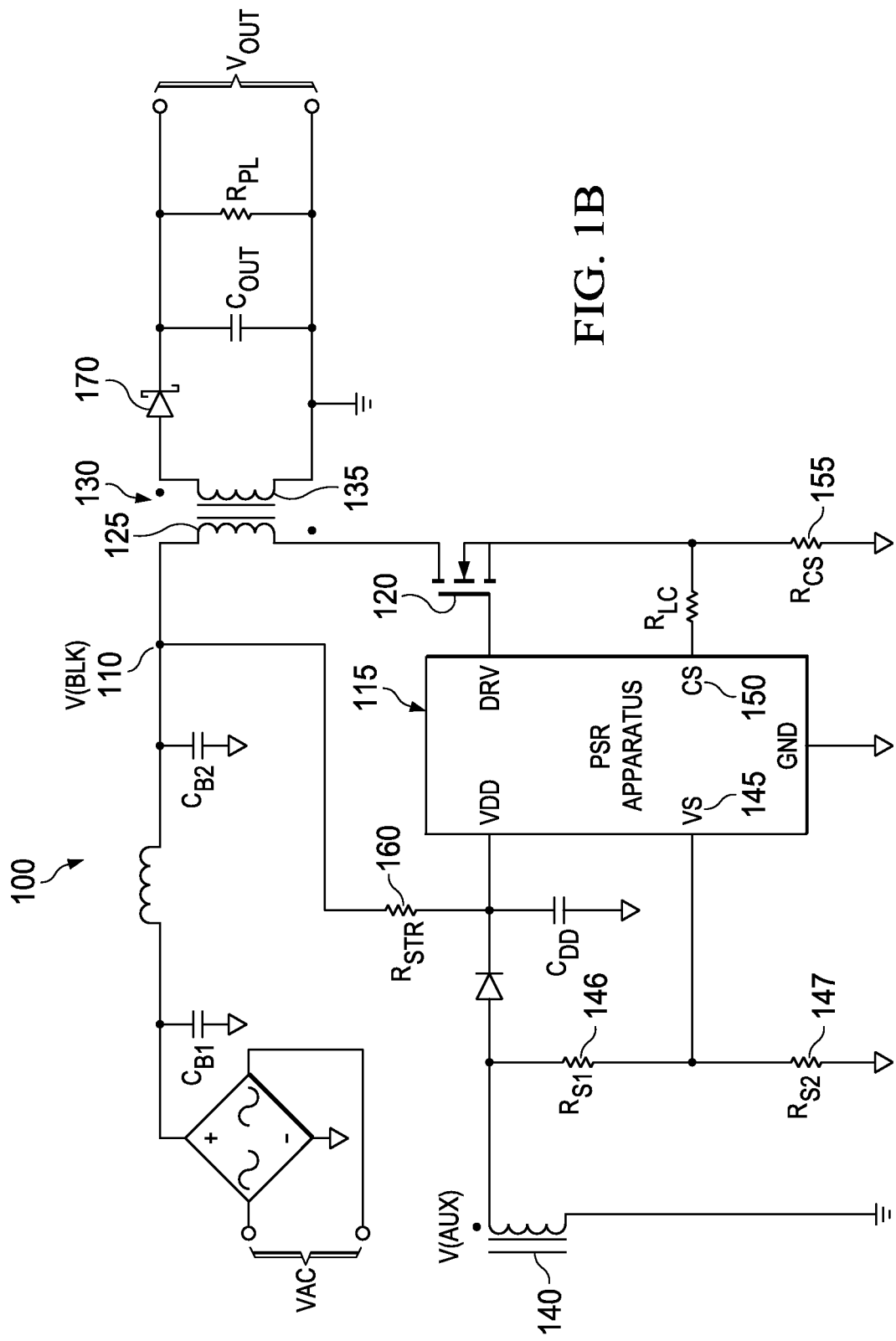
FIG. 1B is a block diagram of a primary side regulation flyback power converter according to various example embodiments of the invention.

FIG. 1B is a block diagram of a primary side regulated flyback power converter 100 according to various example embodiments of the invention. Although an AC/DC converter is shown in FIG. 1B, embodiments herein apply equally to AC/DC and DC/DC converters.

In the case of the AC/DC converter, the AC input is rectified and filtered to provide a DC input V(BLK) 110. A PSR apparatus 115 modulates a power switch 120 on and off to create a switched current through the primary 125 of the flyback transformer 130. A collapsing magnetic field resulting from turning off the switch 120 induces a positive current in the secondary winding 135 of the flyback transformer 130.

The PSR apparatus 115 receives feedback information from an auxiliary primary winding 140 wound on the same core as the primary winding 125 and the secondary winding 135. The voltage waveforms and magnitudes appearing across the auxiliary primary winding 140 are representative of similar waveforms and magnitudes appearing across the output secondary winding 135 at any particular time during switching operations. Scaled feedback signals from the auxiliary primary winding 140 are provided at VS terminal 145 via voltage divider resistors R(S1) 146 and R(S2) 147. The feedback signals are operated upon by the PSR apparatus 115 as mentioned briefly above and as detailed below.

In addition to the feedback signals appearing at the VS terminal, current through the switched primary transformer winding 125 is effectively sensed at a current sense (CS) terminal 150 as a voltage drop across a current sense resistor R(CS) 155. Initial power to start up the PSR apparatus 115 is provided by startup resistor R(STR) 160. Once the converter begins switching, operational power is provided to the PSR apparatus 115 by the auxiliary winding 140.

Figure 2:
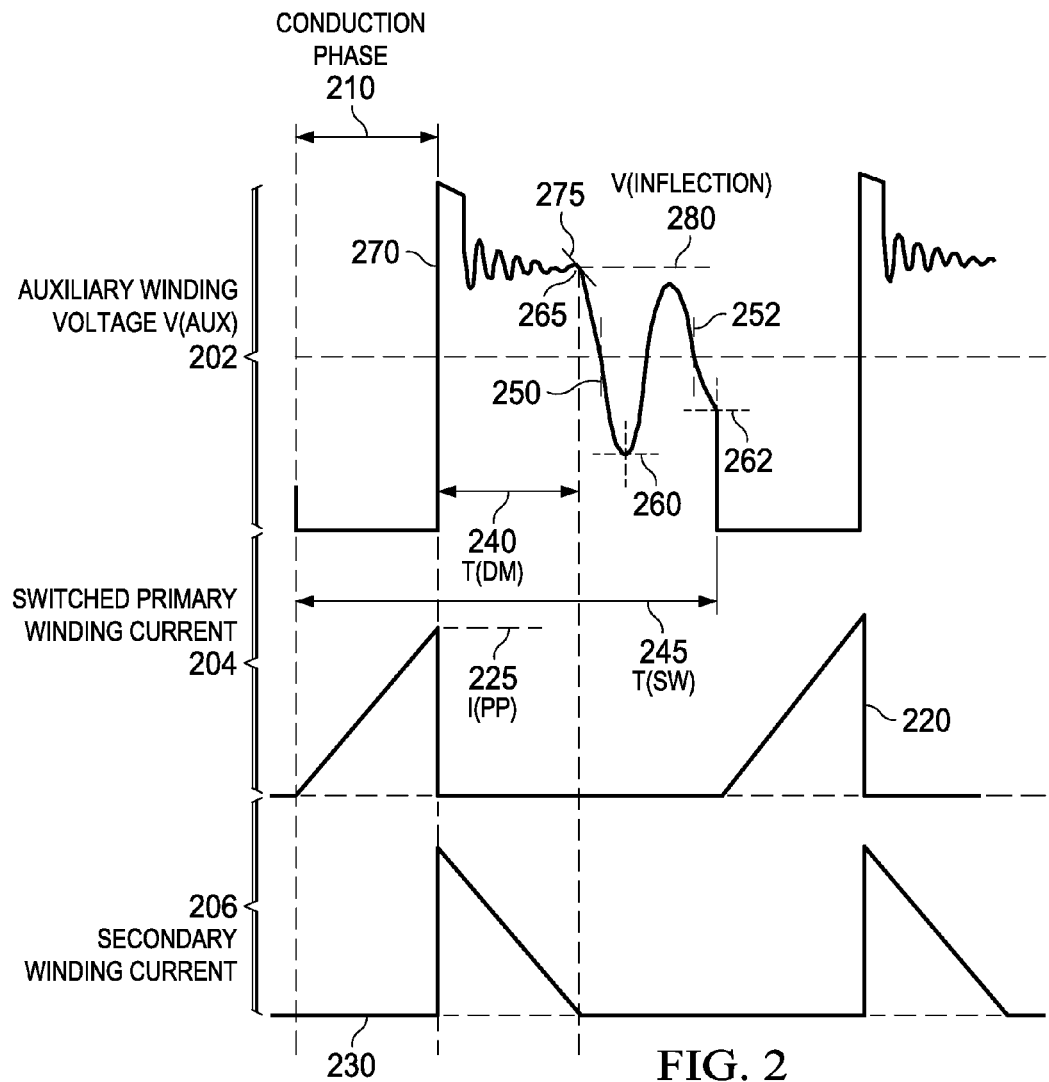
FIG. 2 is a waveform diagram illustrating voltage and current waveforms associated with a primary side regulated flyback power converter according to various example embodiments.

FIG. 2 is a waveform diagram illustrating voltage and current waveforms associated with a primary side regulated flyback power converter according to various example embodiments. Considering FIG. 2 in light of FIG. 1B, waveform 202 represents voltage V(AUX) across the auxiliary primary winding 140 of the flyback transformer 130. Waveform 204, time-aligned with waveform 202, represents current flowing through the switched primary winding 125.

Waveform 206, time-aligned with waveforms 202 and 204, represents current flowing through the secondary winding 135. The magnitude of the currents shown in waveforms 204 and 206 are related by the primary-to-secondary turns ratio of the flyback transformer 130.

A conduction phase 210 is initiated when the switch 120 is turned on by the PSR apparatus 115. Current 220 through the primary winding 125 ramps up substantially linearly during the conduction phase to a peak value I(PP) 225 and then drops to zero when the switch 120 is turned off. As the magnetic field surrounding the primary winding 125 collapses, the diode 170 becomes forward-biased and allows current 230 induced in the secondary 135 to flow. The secondary current 230 flows at a substantially linearly decreasing magnitude during the demagnetization period T(DM) 240 as the magnetic field continues to collapse.

The V(AUX) waveform 202 is sensed by the PSR apparatus 115 at the VS terminal 145. The PSR apparatus 115 identifies characteristics of the waveform 202, including characteristics identifying the beginning and ending times of the period T(DM) 240 and the overall switching period T(SW) 245. The PSR apparatus 115 also identifies one or more negative-going zero voltage crossover points (e.g., the crossover points 250 and 252) related to one or more valley switching points (e.g., the valley switching points 260 and 262). The waveform characteristics are used by the PSR apparatus 115 to regulate converter 100 output voltage and current. In particular, the PSR apparatus 115 controls a switching period T(SW) 245 and varies the peak primary winding current I(PP) 225 to perform both constant current and constant voltage mode regulation.

From the V(AUX) waveform 202, the PSR apparatus 115 initiates the beginning of the period T(SW) 245 as the negative-going zero crossing associated with closure of the switch 120. The PSR apparatus 115 identifies the beginning of period T(DM) 240 as the positive-going zero voltage crossover point after opening the switch 120. The end of the period T(DM) 240 is identified as a negative inflection point 265. Some embodiments may identify the inflection point 265 as a minimum value of a mathematical derivative of the waveform 202 following a decaying resonance 270. Some embodiments may, for example, calculate the second derivative of the waveform 202 for such purpose. The second derivative of the waveform 202 is represented as a rate of change of the slope 275 at the point of inflection 265.

The PSR apparatus 115 also measures the voltage V(INFLECTION) 280 at the inflection point 265. The voltage V(INFLECTION) 280 is a factored representation of the output voltage of the converter 100 and is compared to the output voltage setpoint for purposes of constant voltage regulation. The period T(DM) 240 is representative of the period of current flow through the secondary 135 to the load. T(DM) 240, I(PP) 225, and T(SW) 245 are used by the PSR apparatus 115 to regulate output current.

For cases where the secondary current 230 goes to zero before the next switching cycle, the converter operates in a discontinuous conduction mode. In that case, embodiments herein perform output current regulation by controlling I(PP) 225 of the triangular primary current 220 and a ratio of secondary conduction time T(DM) 240 to the total switching period T(SW) 245.

The zero voltage crossover points (e.g., the crossover points 250 and 252) are used by the PSR apparatus 115 to effect valley switching at a selected point (e.g., the points 260 and 262) following a known delay. Valley switching results in turn-on of the switch 120 at a time of minimal voltage across the switch 120. In the example illustrated by waveform 202 of FIG. 2, switching is shown as occurring at the valley 262 following the negative-going zero crossing 252. It is noted that some embodiments may incorporate switching immediately following expiration of a minimum value of the switching period T(SW) 245, or following a short delay thereafter, rather than exercising valley switching.

Figure 3A:
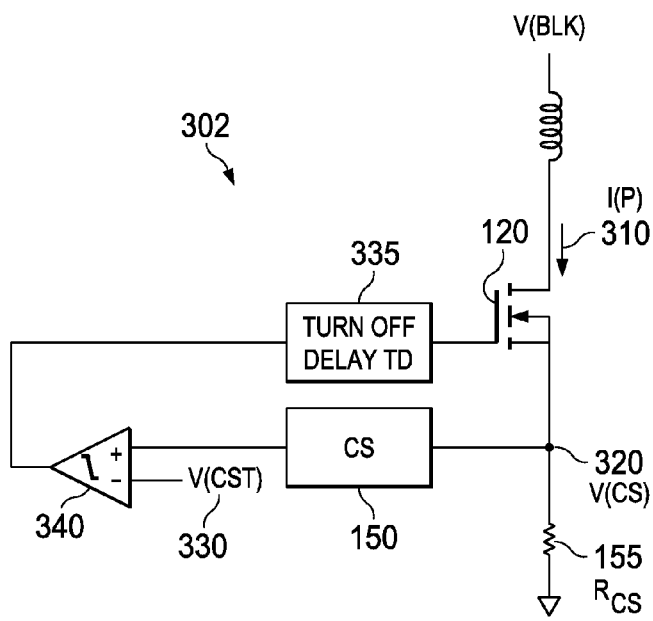
FIGS. 3A and 3B are a modeled circuit and waveforms showing peak primary current overshoot as a function of line input voltage.
Figure 3B:
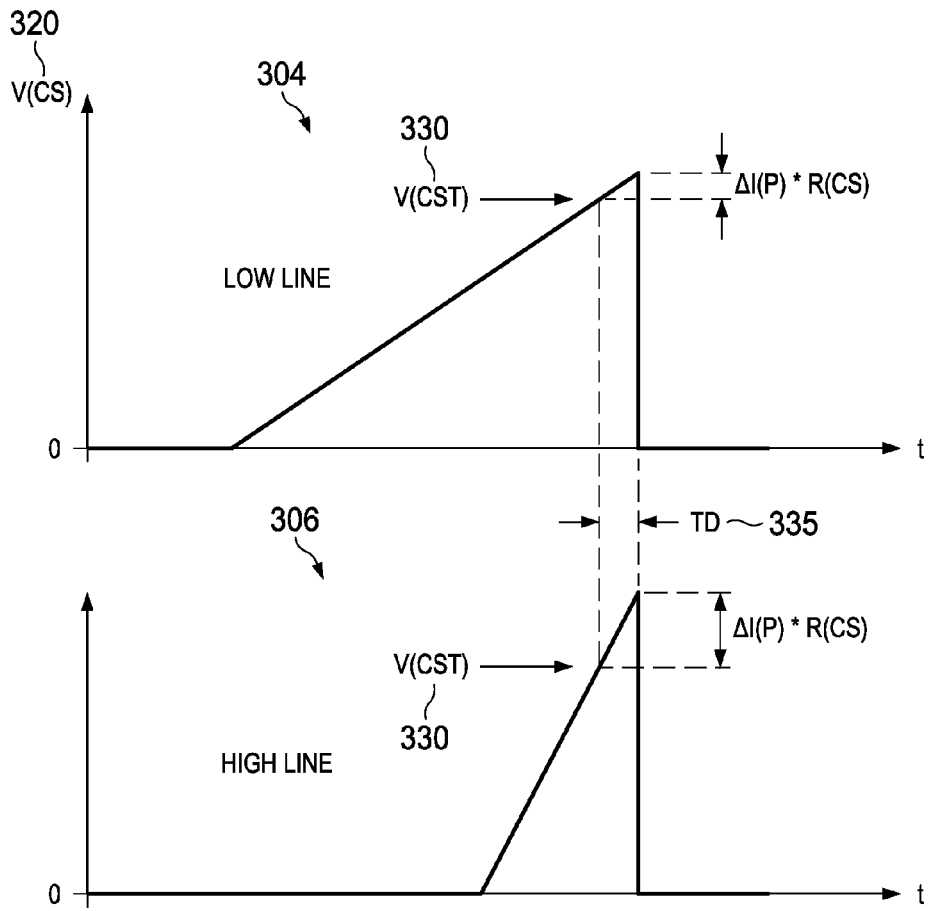

FIGS. 3A and 3B are a modeled circuit 302 and waveforms 304 and 306 showing peak primary current overshoot as a function of line input voltage. Waveforms 304 and 306 illustrate voltage V(CS) 320 across the current sense resistor R(CS) 155 during the conduction phase 210. Waveform 304 represents the case of a lower line input voltage such as that associated with residential power in North America. Waveform 306 represents a higher line input voltage such as may be found in some parts of Europe, Asia, Latin America, etc.

Voltage V(CS) 320 across R(CS) 155 represents primary winding current I(P) 310. V(CS) 320, sensed by the PSR apparatus 115 at CS terminal 150, is used to turn off the switch 120 when I(P) reaches a peak threshold represented by current sense threshold voltage V(CST) 330. However, circuit propagation delay TD 335 results in an actual switching time later than that triggered by the comparator 340.

Waveforms 304 and 306 show an overshoot of V(CS) 320 past the desired V(CST) cutoff point 330, representing an overshoot of primary current I(P) 310. Furthermore, a comparison of the low line voltage waveform 304 to the higher line voltage waveform 306 shows a differential result. The magnitude of the overshoot of I(P) 310 resulting from a given turn off delay TD 335 is a function of line voltage. Embodiments of the PSR apparatus 115 address the line voltage-dependent overshoot problem as described hereinafter.

Figure 4:
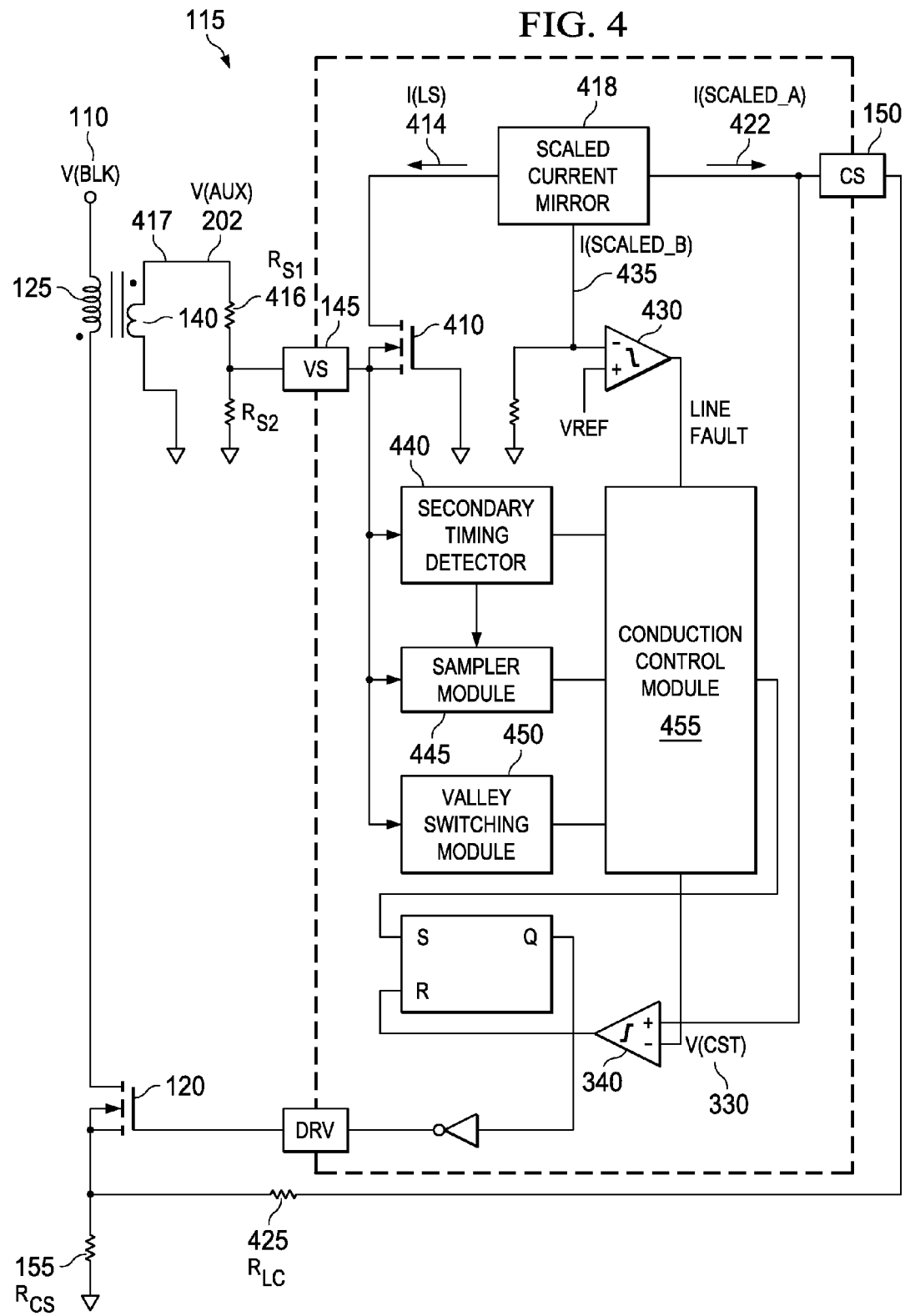
FIG. 4 is a block diagram of a primary side regulator apparatus and components associated with a flyback power converter according to various example embodiments.

FIG. 4 is a block diagram of a PSR apparatus 115 and components associated with a flyback power converter 100 according to various example embodiments. The PSR apparatus 115 includes a voltage clamping device 410. The voltage clamping device 410 sources a line sense current I(LS) 414 at VS terminal 145 during a conduction phase (e.g., the conduction phase 210 of FIG. 2) of the switched primary winding 125. In some embodiments, the voltage clamping device 410 clamps the VS terminal 145 to zero volts during the conduction phase in order to limit I(LS) 414 to a single current path through resistor R(S1) 416.

I(LS) 414 is proportional to voltage V(AUX) 202 generated in the auxiliary primary winding 140 associated with the flyback transformer 130. During conduction V(AUX) is negative, with a magnitude proportional to the rectified line input voltage V(BLK) 110 applied across the switched primary winding 125. Proportionality between I(LS) 414 and V(AUX) 202 is maintained by resistor R(S1) 416 coupled between the VS terminal and a terminal 417 of the auxiliary winding 140. I(LS) 414 is also proportional to input voltage V(BLK) 110 via the turns ratio between the primary winding 125 and the auxiliary primary winding 140.

The PSR apparatus 115 also includes a scaled current mirror 418 coupled to the voltage clamping device 410. The scaled current mirror 418 produces a scaled version I(SCALED_A) 422 of I(LS) 414. The PSR apparatus 115 injects I(SCALED_A) from CS terminal 150 into resistor R(CS) 155 as a negative feedback peak current stabilization signal for the switched primary winding 125. This feedback mechanism provides proportionally more cutoff bias as input line voltage increases. It therefore compensates for the problem of differential primary current overshoot as a function of input line voltage discussed in the context of FIG. 3. Some embodiments may include resistor R(LC) 425 to provide settable gain control for the feedback signal.

The PSR apparatus 115 also includes a line fault device 430 coupled to the scaled current mirror 418. The line fault device 430 senses V(AUX) 202 and V(BLK) 110 via a scaled version I(SCALED_B) 435 of I(LS) 414 during the conduction phase. The device 430 initiates under-voltage lock-out capability and/or reset in a case of V(BLK) 110 below a specified level.

Turning now to functions performed by the PSR apparatus 115 in light of the waveforms of FIG. 2, the PSR apparatus 115 includes a secondary timing detector 440 coupled to the VS terminal 145. The secondary timing detector 440 receives a scaled version of the V(AUX) waveform 202 at the VS terminal 145. The secondary timing detector 440 analyzes the scaled V(AUX) waveform 202 to determine beginning and end points associated with the demagnetization period T(DM) 240 of FIG. 2. The secondary timing detector 440 also identifies the negative inflection point 265 of the V(AUX) waveform 202. The negative inflection point 265 represents an endpoint of the period T(DM) 240 at which point current through the auxiliary primary winding has decreased to substantially zero. The period T(DM) 240 thus represents current flow from the secondary winding 135 and through the diode 170. The average value of current through the secondary winding 135 is equal to the average current to the load of FIG. 1B.

The PSR apparatus 115 also includes a sampler module 445 coupled to the VS terminal and to the secondary timing detector 440. The sampler module 445 receives a timing signal from the secondary timing detector 440 identifying the inflection point 265. The sampler module 445 then samples and holds a magnitude V(INFLECTION) 280 of the scaled version of the V(AUX) waveform 202 at a time corresponding to the negative inflection 265. V(INFLECTION) 280 represents a scaled version of actual power converter output voltage and is used by the PSR apparatus 115 to maintain output voltage regulation.

The PSR apparatus 115 also includes a valley switching module 450 coupled to the VS terminal 145. The valley switching module 450 senses the negative-going zero crossings (e.g., the zero crossings 250 and 252) of the scaled version of the V(AUX) waveform 202 following the occurrence of the inflection point 265 as shown in FIG. 2. The first negative going zero crossing following expiration of a selected minimum value of the switching period T(SW) 245 is used as a timing reference. The timing reference causes triggering of the power switch 120 to an on state at the next V(AUX) waveform valley, a time of minimal current flow in both the primary winding 125 and the secondary winding 135. The PSR apparatus 115 exercises control of the switching period T(SW) 245 to initiate the next switching cycle. It is note that the next switching cycle may begin on the valley 260 after the first zero crossing 250 or on a subsequent valley following a corresponding subsequent zero crossing.

The PSR apparatus 115 also includes a conduction control module 455 communicatively coupled to the secondary timing detector 440, the sampler module 445, and the valley switching module 450. Referring back to FIG. 2, the conduction control module 455 determines the peak switched primary current I(PP) 225 and a minimum value of the switching period T(SW) 245. Regulation is maintained as a function of V(INFLECTION) 280 and the secondary conduction period T(DM) 240. The conduction control module 455 enables an on state at the power switch 120 at a waveform valley once a minimum transcurrence of the period T(SW) 245 has occurred. Turn-on timing is synchronized to an immediately-prior negative-going zero crossing and occurs an estimated quarter-cycle period after the zero crossing.

The PSR apparatus 115 also includes a current cutoff device 340 communicatively coupled to the CS terminal 150. The current cutoff device 340 monitors switched primary current as a function of a voltage drop across current sense resistor R(CS) 155 in series with the switched primary winding 125. The current cutoff device 340 turns off the power switch 120 when a desired peak switched primary current I(PP) 225 is reached. The magnitude of I(PP) 225 is determined by the conduction control module 455 to maintain voltage and/or current regulation and is presented to the current cutoff device 340 as the current sense control voltage V(CST) 330 as previously discussed in the context of FIG. 3.

Figure 5:
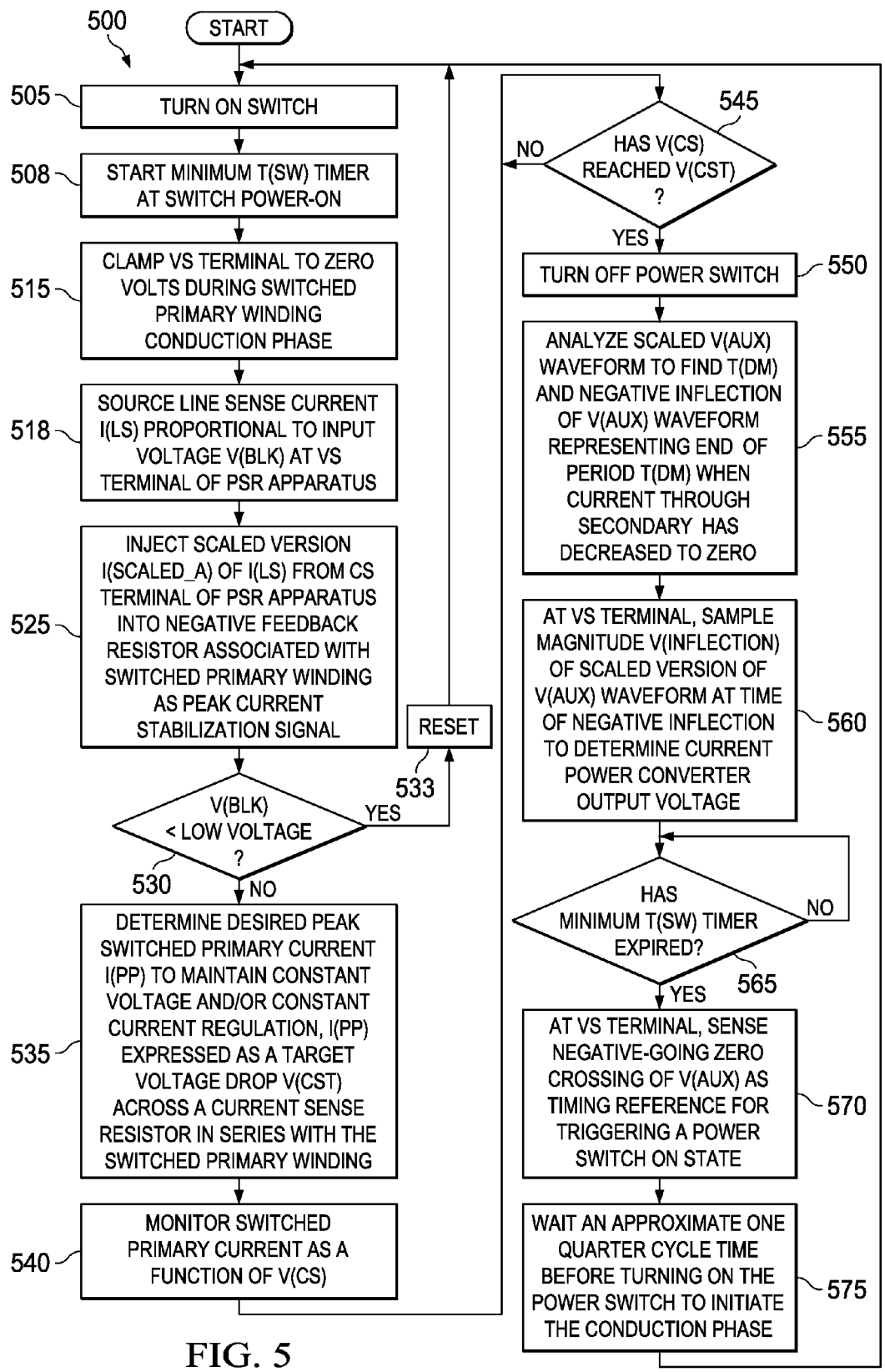
FIG. 5 is a flow diagram illustrating a method of primary side output voltage and current regulation in a PSR apparatus associated with a flyback power converter according to various example sequences.

FIG. 5 is a flow diagram illustrating a method 500 of primary side voltage and current regulation in a PSR apparatus associated with a flyback power converter (e.g., the flyback power converter of FIG. 1B and the PSR apparatus of FIG. 4) according to various example sequences. A waveform V(AUX) is generated in an auxiliary primary winding of a flyback transformer external to the PSR apparatus. During a portion of a switching cycle, the magnitude of V(AUX) is proportional to a rectified line input voltage V(BLK) applied across the switched primary winding of the flyback transformer. During a separate portion of the switching cycle, the magnitude of V(AUX) is proportional to the output voltage V(OUT) of the converter. The method 500 includes receiving a scaled version of V(AUX) at a VS terminal associated with the PSR apparatus.

The method 500 commences at block 505 with turning on a power switch to initiate conduction through the primary winding of the flyback transformer. The method also includes starting a timer associated with a minimum switching period T(SW), at block 508.

The method 500 continues with a sequence to normalize the overshoot of peak primary current I(PP) as a function of input line voltage. The method 500 includes clamping the VS terminal to zero volts during the switched primary winding conduction phase, at block 515. The method 500 also includes sourcing a line sense current I(LS) at the VS terminal during the conduction phase, at block 518. Clamping the VS terminal to zero volts results in I(LS) being proportional to a rectified line input voltage V(BLK) and to the voltage V(AUX). Proportionality is maintained via a resistor coupled between the VS terminal and a terminal of the auxiliary primary winding.

The method 500 also includes injecting a scaled version I(SCALED_A) of the line sense current I(LS) into a negative feedback resistor associated with the switched primary winding of the flyback transformer, at block 525. I(SCALED_A) is sourced from a CS terminal of the PSR apparatus and acts as a peak current stabilization feedback signal. The method 500 further includes determining whether V(BLK) is below a specified low-voltage threshold, at block 530. If so, the method 500 includes initiating under-voltage lock-out operations (e.g., reset operations), at block 533.

The method 500 continues at block 535 with determining a desired peak switched primary current I(PP) to maintain voltage and/or current regulation. Desired I(PP) is expressed as a target voltage drop V(CST) across a current sense resistor in series with the switched primary winding. The method 500 includes monitoring switched primary current as a function of the actual voltage drop V(CS) across the current sense resistor, at block 540. The method 500 further includes determining whether V(CS) has reached V(CST), at block 545, and turning off the power switch when V(CS) has reached V(CST), at block 550.

The method 500 continues at block 555 with analyzing the scaled V(AUX) waveform to determine a demagnetization period T(DM). T(DM) is determined by identifying a negative inflection of the V(AUX) waveform. The negative inflection represents an endpoint of the period T(DM) at which point current through the auxiliary primary winding has decreased to substantially zero. The method 500 also includes sampling a magnitude V(INFLECTION) of the waveform inflection point, at block 560. The sample V(INFLECTION) represents a scaled version of power converter output voltage.

The method 500 includes determining whether the minimum T(SW) timer has expired, at block 565. If so, the method 500 continues with sensing a next negative-going zero crossing of the scaled version of the V(AUX) waveform at the VS terminal, at block 570. The negative-going zero crossing is used as a timing reference for triggering an on state at a power switch in series with the switched primary winding of the flyback transformer. The method 500 also includes waiting an approximate one-quarter cycle time before turning on the power switch to initiate another conduction phase, at block 575. The method 500 repeats at block 505 for successive switching cycles.

Modules and components described herein may include hardware circuitry, optical components, single or multi-processor circuits, and/or memory circuits. Disclosed modules and components may also include computer-readable media with computer instructions encoded therein/thereon capable of being executed by a processor, including non-volatile memory with firmware stored therein, but excluding non-functional descriptive matter. Subject matter of the instant disclosure may also include combinations of described modules and components, as desired by the architects of the PSR apparatus 115 and method 500 and as appropriate for particular implementations of various embodiments.

Systems and methods described herein may be useful in applications other than voltage and current regulation in a flyback power converter. Examples of the PSR apparatus 115 and the method 500 are intended to provide a general understanding of the structures of various embodiments and the flow of various sequences. They are not intended to serve as complete descriptions of all elements and features of apparatus and systems that might make use of these structures and sequences.

The various embodiments may be incorporated into receptacle power converters, electronic circuitry used in computers, communication and signal processing circuitry, single-processor or multi-processor modules, single or multiple embedded processors, multi-core processors, data switches, and application-specific modules including multi-layer, multi-chip modules, among others. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others.

Apparatus and methods described herein sense characteristics of a waveform associated with an auxiliary primary winding of a PSR flyback transformer at a single regulator terminal. Error signals derived from the waveform characteristics are used to maintain constant voltage and/or constant current regulation and to generate a peak current stabilization signal that is independent of line input voltage. Decreased power consumption and higher levels of integration may result.

By way of illustration and not of limitation, the accompanying figures show specific embodiments in which the subject matter may be practiced. It is noted that arrows at one or both ends of connecting lines are intended to show the general direction of electrical current flow, data flow, logic flow, etc. Connector line arrows are not intended to limit such flows to a particular direction such as to preclude any flow in an opposite direction. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense. The breadth of various embodiments is defined by the appended claims and the full range of equivalents to which such claims are entitled.

Such embodiments of the inventive subject matter may be referred to herein individually or collectively by the term "invention" merely for convenience and without intending to voluntarily limit this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. The following claims are hereby incorporated into the Detailed Description, with each claim standing on its own as a separate embodiment.

What is claimed is:

1. A primary side regulation (PSR) apparatus associated with a flyback power converter, comprising:

a voltage clamping device coupled to an auxiliary winding to source a line sense current I(LS) at a voltage sense (VS) terminal of the PSR apparatus during a conduction phase of a switched primary winding associated with a flyback transformer external to the PSR apparatus, I(LS) proportional to an input voltage V(BLK) and to a voltage V(AUX) generated in an auxiliary primary winding associated with the flyback transformer, the voltage clamping device to clamp the VS terminal to zero volts during the switched primary winding conduction phase in order to limit I(LS) to a single current path external to the PSR apparatus;

wherein the following are connected to a single voltage sense (VS) terminal of the PSR apparatus:

a secondary timing detector coupled to the VS terminal to receive a scaled version of a V(AUX) waveform and to analyze the scaled V(AUX) waveform to determine a demagnetization period T(DM) by identifying a negative inflection of the V(AUX) waveform representing an endpoint of the period T(DM) at which point current through the auxiliary primary winding has decreased to substantially zero;

a sampler module coupled to the VS terminal to sample and hold a magnitude V(INFLECTION) of the scaled version of the V(AUX) waveform at a time corresponding to the negative inflection, V(INFLECTION) representing a scaled version of power converter output voltage; and a valley switching module coupled to the VS terminal to sense a negative-going zero crossing of the scaled version of the V(AUX) waveform as a timing reference for triggering an on state at a power switch in series with the switched primary winding of the flyback transformer; and further comprising:

a scaled current mirror coupled to the voltage clamping device to produce a scaled version I(SCALED_A) of I(LS), I(SCALED_A) to be injected from a current sense (CS) terminal of the PSR apparatus into a negative feedback resistor associated with the switched primary winding of the flyback transformer as a peak switch current stabilization signal with respect to the input voltage.

2. The PSR apparatus of claim 1, a magnitude of V(AUX) proportional to a rectified line input voltage V(BLK) applied across the switched primary winding of the flyback transformer.

3. The PSR apparatus of claim 1, the proportionality of I(LS) and V(AUX) maintained by a resistor coupled between the VS terminal and a terminal of the auxiliary primary winding.

4. The PSR apparatus of claim 1, further comprising:
a line fault device coupled to the scaled current mirror, the line fault device to sense V(AUX) and V(BLK) via a scaled version I(SCALED_B) of I(LS) during the conduction phase and to initiate under-voltage lock-out capability in a case of V(BLK) below a specified level.

5. The PSR apparatus of claim 1, further comprising:
a conduction control module communicatively coupled to the valley switching module to determining a peak switched primary current I(PP) to maintain regulation as a function of V(INFLECTION) and to trigger an on state at a power switch in series with the switched primary winding of the flyback transformer at a waveform valley occurring a quarter-cycle period after the negative-going zero crossing sensed by the valley switching module.

6. The PSR apparatus of claim 5, further comprising:
a current cutoff device coupled to the CS terminal to monitor switched primary current as a function of a voltage drop across a current sense resistor R(CS) in series with the switched primary winding and to turn off the power switch when a desired peak switched primary current I(PP) is reached as determined by the conduction control module to maintain voltage and/or current regulation.

7. A method associated with primary side regulation (PSR) in a flyback power converter, comprising:
sourcing a line sense current I(LS) at a voltage sense (VS) terminal of a PSR apparatus during a conduction phase of a switched primary winding associated with a flyback transformer external to the PSR apparatus, I(LS) proportional to an input voltage V(BLK) and to a voltage V(AUX) generated in an auxiliary primary winding associated with the flyback transformer;
clamping the VS terminal to zero volts during the switched primary winding conduction phase in order to limit I(LS) to a single current path external to the PSR apparatus;
wherein the following are performed utilizing the signal received at the single voltage sense (VS) terminal:
receiving a scaled version of a V(AUX) waveform;
analyzing the scaled V(AUX) waveform to determine a demagnetization period T(DM) by identifying a negative inflection of the V(AUX) waveform representing an endpoint of the period T(DM) at which point current through the auxiliary primary winding has decreased to substantially zero;
sampling a magnitude V(INFLECTION) of the scaled version of the V(AUX) waveform at a time corresponding to the negative inflection, V(INFLECTION) representing a scaled version of power converter output voltage;
sensing a negative-going zero crossing of the scaled version of the V(AUX) waveform as a timing reference for triggering an on state at a power switch in series with the switched primary winding of the flyback transformer; and
turning on the power switch to initiate a conduction phase one-quarter cycle after sensing the negative-going zero crossing;
and further comprising:
injecting a scaled version I(SCALED_A) of the line sense current I(LS) from a current sense (CS) terminal of the PSR apparatus into a negative feedback resistor associated with the switched primary winding of the flyback transformer as a peak switch current stabilization signal with respect to the input voltage.

8. The method of claim 7, further comprising:
maintaining the proportionality of I(LS) and V(AUX) via a resistor coupled between the VS terminal and a terminal of the auxiliary primary winding.

9. The method of claim 7, further comprising:
sensing V(AUX) and V(BLK) via I(LS) during the conduction phase; and
initiating under-voltage lock-out operations in a case of V(BLK) below a specified level.

10. The method of claim 7, further comprising:
setting a minimum value of a switching period T(SW) as a function of V(INFLECTION) and T(DM);
loading a timer with the minimum value of T(SW);
starting the timer; and
stopping the timer upon expiration and prior to a next power switch conduction cycle.

11. The method of claim 7, further comprising:
determining a desired peak switched primary current I(PP) to maintain voltage and/or current regulation;
monitoring I(PP) as a function of a voltage drop V(CS) across a current sense resistor in series with the switched primary winding; and
turning off the power switch when the desired I(PP) is reached.

12. A method associated with a flyback power converter, comprising:
sourcing a line sense current I(LS) at a voltage sense (VS) terminal of a PSR apparatus during a conduction phase of a switched primary winding associated with a flyback transformer external to the PSR apparatus, I(LS) proportional to an input voltage V(BLK) and to a voltage V(AUX) generated in an auxiliary primary winding associated with the flyback transformer;
injecting a scaled version I(SCALED_A) of the line sense current I(LS) from a current sense (CS) terminal of the PSR apparatus into a negative feedback resistor associated with the switched primary winding of the flyback transformer as a peak switch current stabilization signal with respect to the input voltage
sensing V(AUX) and V(BLK) via I(LS) during the conduction phase; and
initiating under-voltage lock-out operations in a case of V(BLK) below a specified level;

at a single VS terminal, receiving a scaled version of a V(AUX) waveform;

analyzing the scaled V(AUX) waveform to determine a demagnetization period T(DM) by identifying a negative inflection of the V(AUX) waveform representing an endpoint of the period T(DM) at which point current through the auxiliary primary winding has decreased to substantially zero;

sampling a magnitude V(INFLECTION) of the scaled version of the V(AUX) waveform received at the single VS terminal at a time corresponding to the negative inflection, V(INFLECTION) representing a scaled version of power converter output voltage; and at the single VS terminal, sensing a negative-going zero crossing of the scaled version of the V(AUX) waveform as a timing reference for triggering an on state at a power switch in series with the switched primary winding of the flyback transformer.

* * * * *